Nov. 12, 1935.    O. W. LOUDENSLAGER    2,020,692
RESILIENT DEVICE
Filed Feb. 21, 1934
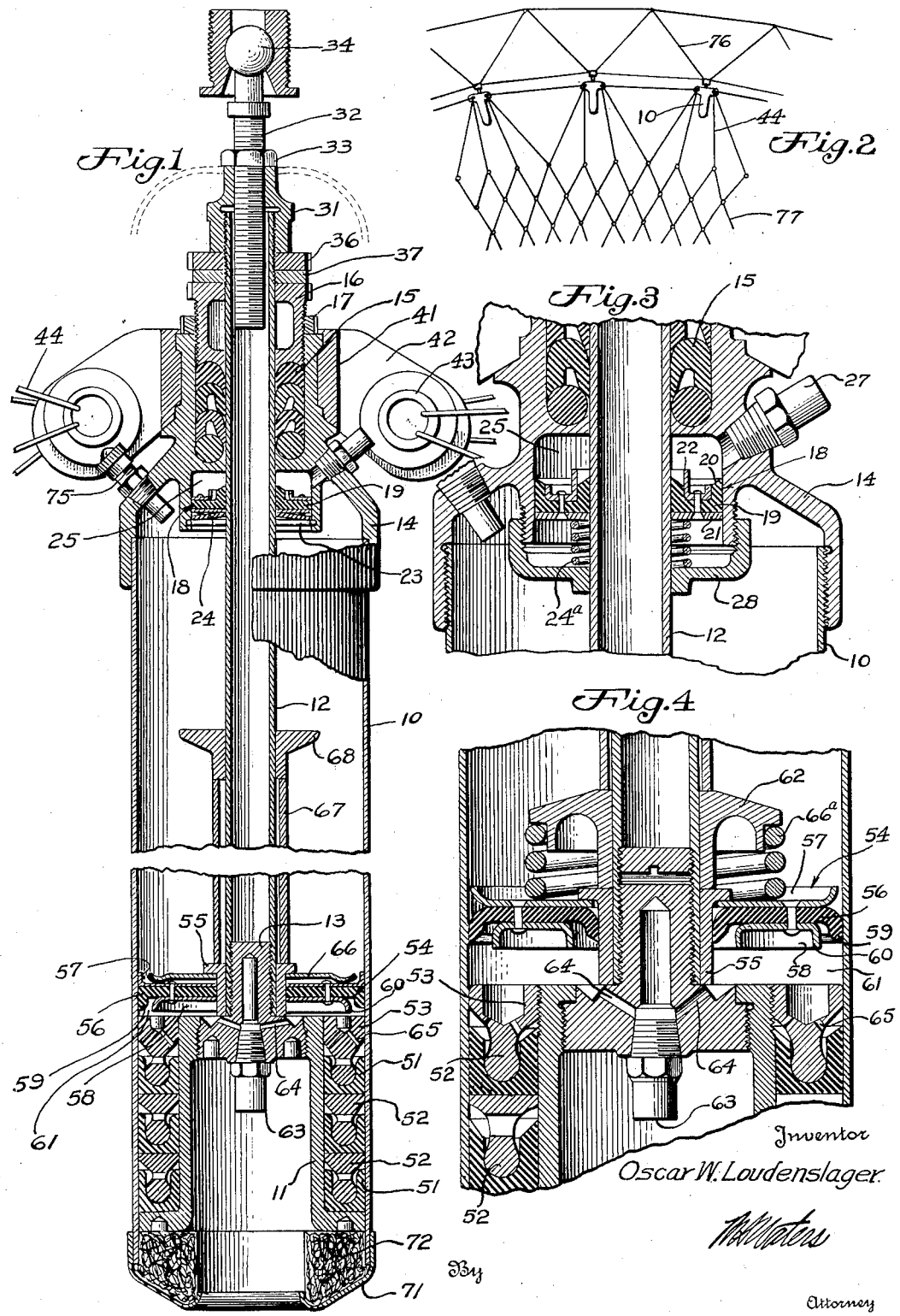

Patented Nov. 12, 1935

2,020,692

UNITED STATES PATENT OFFICE 2,020,692

RESILIENT DEVICE

Oscar W. Loudenslager, Akron, Ohio, assignor to Goodyear-Zeppelin Corporation, Akron, Ohio, a corporation of Delaware Application February 21, 1934, Serial No. 712,330

7 Claims. (Cl. 267—1)

This invention relates to shock absorbers or resilient connecting devices and more particularly to such devices employing fluid-cushioning means.

One object of the invention is to provide an air cylinder including resilient device in which the resiliency of the device will be substantially constant over long periods of use without adjustment.

Another object of the invention is to provide a mechanically strong, cushioning device which is adjustable to any desired resiliency, but which will be sufficiently light in weight as to be particularly adaptable to use on aircraft.

Another object of the invention is to provide improved sealing means and a new combination of parts in a fluid-cushioning device.

Another object of the invention resides in the provision of resilient connecting means which are particularly adapted to secure bulkheads in place in the main rings of a rigid airship.

For a better understanding of the invention, reference may now be had to the accompanying drawing, in which:

Fig. 1 is a longitudinal sectional view illustrating the device embodying the invention.

Fig. 2 is a fragmentary view of a bulkhead netting and main frame of a rigid airship illustrating the manner in which the resilient device connects the same together.

Fig. 3 is an enlarged fragmentary view of a slightly modified form of improved gasket means for sealing between the piston rod and the cylinder end.

Fig. 4 is an enlarged fragmentary view of a slightly modified form of improved gasket means for sealing between the piston and the cylinder.

The present application is a continuation in part of my co-pending application Ser. No. 549,706 filed July 9, 1931 on a resilient device. Referring to the drawing, a cylinder 10 slidably carries a piston 11 that is secured to a hollow piston rod 12 in any desired manner, such as by a plug 13 which is threaded to engage cooperating threaded portions on the piston and rod. The rod 12 extends through and is slidably journaled in a cylinder cap 14, which is secured to one end of the cylinder 10. The cap 14 is provided with suitable mechanical pressure gasket means for sealing against the rod 12, which includes packing 15 disposed in a channel in the cap 14. A gland nut 16, which surrounds the rod 12 and which is threaded in the end of the cap 14, serves to clamp the packing 15 tightly in place and against the rod 12. A lock nut 17 is provided on the gland nut 16 and engages the end of the cap 14 to hold the gland nut 16 locked in any desired position.

Other sealing means shown generally at 18 are also provided between the cap 14 and piston rod 12, which sealing means are fluid actuated and which include a flexible member 19 of leather or rubber. The flexible member 19 is formed with an integral axially extending annular lip 20 and is adapted to be supported between metal washers 21 and 22. The washer 22 may be provided with an axially extending annular flange at its inner periphery which strengthens the washer but does not interfere with application of fluid pressure means to the lip 20 of the flexible member 19. The whole unit or sealing means 18 is resiliently positioned by a spring spider 24 and a locking ring 23 in a chamber 25 formed in the inner end of the cap 14.

In the embodiment of the invention illustrated in Fig. 3 the mechanical spring means for resiliently urging the sealing unit 18 into the chamber 25 takes the form of a helical spring 24a which bears against a cover 28 secured in the end of the cap 14. The chamber 25 is filled with grease or other heavy lubricant and to this end a pressure gun valve fitting 27 is provided on the cap 14, which opens to the chamber 25.

It will be noted that the spring means 24 and 24a function to resiliently urge the gasket unit 18 into the chamber 15 against the fluid pressure created in this chamber by the grease or lubricant forced therein. Thus the gasket unit 18 will be held in tight sealing relation at all times between the piston rod 12 and the walls of the chamber 25 formed in the cylinder cap 14. Variations in pressure in the chamber 25, such as may be occasioned by temperature changes, loss of fluid, or other known means, is readily compensated for while maintaining the gasket unit 18 in tight sealing relation at all times.

The rod 12 is provided with extensible means and for this purpose the outer end of the rod is threaded to receive a cap 31, which is internally threaded and receives a threaded rod 32. The threaded rod 32 is locked in position by a lock nut 33 which engages with the cap 31. The rod 32 is adapted to be secured to one of the members to be connected together preferably through the agency of a ball and socket joint, which is indicated diagrammatically at 34. The cap 31 is locked on the end of the piston rod 12 by a nut 36, and leather or other cushioning means 37 is provided between the nut 36 and the gland nut 16.

Surrounding the cap 14 is a collar 41 which is provided with a number of radially extending lugs 42 formed with suitable eyelets 43. The collar 41 and thus the cylinder 10 can be secured by any suitable means such as wires 44, to the other of the members to be resiliently connected together.

The piston 11 is provided with mechanical pressure means for sealing against the cylinder 10, which means comprise a plurality of gaskets 51 which are received about the piston. The gaskets 51 are separated by metal rings 52 and the whole assembly is forced together and into sealing relation with the inner wall of the cylinder 10 by a ring 53, which is threaded on the piston 11.

Additional fluid pressure means for sealing between the piston and the cylinder are provided, which are indicated generally by the numeral 54, and which include a collar 55 secured by suitable means (not shown) on the rod 12 adjacent the piston 11. The sealing means or gasket unit 54 is carried on the collar 55 and comprises a flexible member 56 of leather or rubber which is supported by metal washers 57 and 58. The flexible member 56 is formed with an integral annular lip 59 and the washer 58 is formed with an inwardly turned annular flange 60 around the outer edges so that fluid under pressure will be readily accessible to the lip 59.

The gasket unit, indicated generally by the numeral 54, is adapted to be resiliently urged by positive mechanical spring means towards the piston 11 and to this end a spring spider 66 may be employed which is positioned between the collar 55 and the gasket unit 54 to resiliently urge the gasket unit towards the piston 11. Again, as illustrated in the modification of the invention shown in Fig. 4, a cup abutment 62 may be secured on the piston rod 12 at the outer side of the collar 55. The cup abutment 62 is adapted to receive a coiled spring 66ª which bears against the metallic washer 57 of the gasket unit 54.

From the drawing, it will be observed that a chamber 61 is formed between the sealing means 54 and the piston. The chamber is filled with grease or other lubricating means which is supplied thereto under pressure by way of a pressure gun fitting 63 connected with the chamber by passages 64, which fitting is carried in the plug 13 connecting the rod 12 and piston 11 together.

The ring 53 is provided with passages 65 which open to the chamber 61 so that the lubricant will extend up into contacting relation with the end gasket 51 and will force it into engagement with the cylinder 10 by fluid as well as mechanical pressure.

It will be understood that in the operation of the piston in the cylinder the spring 66 or 66ª will function to resiliently urge the gasket unit 54 into the pressure chamber 61 which contains the grease or other lubricant under sealing pressure. Thus the gasket unit 54 will serve to seal tightly between the piston 11 and the cylinder 10 under all conditions of operation over long periods of time as above explained in detail in conjunction with the operation of gasket unit 18.

In order to limit the movement of the piston 11 in the cylinder, suitable means are preferably provided which may comprise a sleeve 67 carried on the rod 12 which serves to position a flanged abutment 68 on the rod 12. In the movement of the rod 12 and piston 11 outwardly, the abutment 68 will engage with the inner end of the cap 14 to limit the travel of the rod 12 and piston 11 in the cylinder 10.

A ring cap 71, filled with absorbent waste 72, may be secured over the end of the cylinder 10 opposite the cap 14 and will serve to absorb any leakage of oil or grease past the gasket means on the piston.

In order to provide any desired pressure within the cylinder 10, a valve 75 is secured in the cap 14, which valve is connected with the interior of the cylinder 10.

In the operation of the device the chambers 25 and 61 are initially filled with lubricant by way of the fittings 27 and 63. Sufficient lubricant is supplied so that considerable pressure is provided in the chambers, which pressure serves to force the lips 20 and 59 of the flexible members 21 and 56 tightly into sealing engagement. This pressure in the chambers will be resiliently maintained through the agency of the springs 66 or 66ª and 24 or 24ª which resiliently urge the gasket units into the chambers at all times. It can be said that mechanical spring means accordingly assist and maintain the fluid-sealing action of the gasket units. Fluid, such as air, is now supplied to the interior of the cylinder 10 to establish any desired pressure so that the device will be given an initial resiliency. The fluid within the cylinder 10 also functions to urge the gasket units 18 and 54 into their sealing chambers to maintain the flexible members 21 and 56 of the units tightly in sealing engagement. There is thus a double pressing action upon the gasket units which may be described as including a mechanical spring means and a fluid-pressure means.

The device is now ready to resiliently connect any desired members together, which members may, as shown in Fig. 2, comprise a wire bulkhead 77 and a main transverse frame 76 of a rigid airship. The rod 12 of the device will be connected to the frame 76 through the extensible threaded rod 32 and the ball and socket joint 34 while the cylinder 10 will be connected to the bulkhead 77 through the agency of the wires 44 and collar 41.

The seal provided by the mechanical gasket means 14 and 51 can be adjusted by tightening the gland nut 16 and the ring 53 respectively. The pressures in the chambers 61 and 25 may be revived or increased as found necessary from time to time by applying a pressure gun to the fittings 27 and 63. This can readily be done while the resilient fastening device is in operation.

If it is desired to adjust the distance between the means fastened together by the resilient device, the lock nut 33 on the threaded rod 32 may be turned back and the rod 32 screwed in or out of the cap 31 the desired distance, after which the nut 33 is run down against the cap 31 to lock the rod 32 in the adjusted position.

By making the collar 41 smaller than the overall diameter of the cap 14 and cylinder 10, any chance for the fastening means to fail completely mechanically is reduced inasmuch as the piston 11 will be too big to pass through the collar 41. In use the piston 11 and rod 12 can travel in the cylinder 10 only until the abutment 68 engages with the inside end of the cap 14. The distance the abutment 68 is from the piston 11 can be varied by changing the length of the cylinder 67. The leather washer 37 provides a cushion between the gland nut 16 and the nut 36 on the rod 12 so that the complete inward movement of the rod 12 into the cylinder 10 will be somewhat cushioned.

From the foregoing description, it will be seen that a resilient connecting device has been provided in which the resiliency can be initially adjusted over a wide range and which can be readily changed when desired. The device is strong and efficient in operation and yet is light in weight. Mechanical and fluid-pressure means are provided between the piston and cylinder and between the rod and cylinder cap so that the initially applied pressure in the cylinder is retained substantially constant in use over long periods. The resilient fastening device provides adjustable means whereby the distance between the means to be fastened together can be varied, which feature allows it to be more readily secured to the means to be fastened together and which also gives a very desirable take-up between the means.

While the resilient fastening device is light in weight and is particularly adapted for use with aircraft, it will be apparent that it may be used in substantially any relation in which a resilient fastening member or shock absorber is required.

Although I have illustrated but the preferred form of the invention and have described that form in detail, it will be apparent to those skilled in the art that the invention is not so limited but that various modifications may be made therein without departing from the spirit of the invention or from the scope of the appended claims.

What I claim is:

1. A resilient fastening device comprising a cylinder, a piston in the cylinder, a rod secured to the piston and extending through the end of the cylinder, lip gasket means sealing between the piston and the cylinder, lip gasket means sealing between the rod and the end of the cylinder, said lip gasket means being adapted to be forced by a lubricant under pressure into sealing relation with the cylinder and the rod, and mechanism for maintaining the lip gasket means resiliently against the pressure of the lubricant.

2. A resilient connecting device comprising a cylinder having a closed end, a piston slidably carried in the cylinder, a rod connected to the piston and extending through the closed end of the cylinder, lip type fluid-pressure sealing means between the rod and the cylinder end, and between the piston and the cylinder, and valved conduit means connected with the fluid-pressure sealing means, the conduit means being positioned so that fluid under pressure can be supplied thereto while the device is in operation, and resilient mechanism associated with the fluid-pressure sealing means for maintaining the fluid pressure and for forcing the lips of the sealing means into sealing relation at all times.

3. In an air spring, a pair of telescoping members, one of said members including an annular lip packing which bears against the adjacent wall of the other member, said first-named member also having an annular recess filled with lubricant which contacts with the lip of the packing to force it into contact with said wall, and metallic spring means for continuously exerting a pressure on the packing to force it against the pressure of the lubricant during the operation of the air spring to thereby hold the lip of the packing in sealing relation at all times.

4. In an air spring, two telescoping members, one of said members carrying a lip packing for the sliding joint between the members and carrying also a pocket of grease adjacent said packing, said grease forcing the lip of the packing into sealing relation and contacting the telescoping surface of the other of said members, metallic-spring means engaging the lip packing and exerting pressure therethrough upon the grease in said pocket, and means accessible from the exterior of the device for injecting grease into said pocket against the action of said spring means.

5. A resilient fastening device comprising a cylinder, a piston in the cylinder, said piston being yieldably maintained in a predetermined position by gaseous pressure in the cylinder, a rod secured to the piston and extending through the end of the cylinder, lip gasket means sealing between the piston and the cylinder, lip gasket means sealing between the rod and the end of the cylinder, a lubricant under pressure for forcing the lip gasket means into sealing relation with the cylinder and with the rod and spring means acting directly upon the lip gasket means for maintaining the lubricant under compression, thus to minimize the formation of gas bubbles therein and the leakage of gas caused thereby.

6. A resilient fastening device comprising a cylinder, a piston in the cylinder, said piston being yieldably maintained in a predetermined position by gaseous pressure in the cylinder, a rod secured to the piston and extending through the end of the cylinder, lip gasket means sealing between the piston and the cylinder, lip gasket means sealing between the rod and the end of the cylinder, a lubricant under pressure for forcing the lip gasket means into sealing relation with the cylinder and with the rod and a spring spider acting directly upon the lip gasket means for maintaining the lubricant under compression, thus to minimize the formation of gas bubbles therein and the leakage of gas caused thereby.

7. A resilient fastening device comprising a cylinder, a piston in the cylinder, said piston being yieldably maintained in a predetermined position by gaseous pressure in the cylinder, a rod secured to the piston and extending through the end of the cylinder, lip gasket means sealing between the piston and the cylinder, lip gasket means sealing between the rod and the end of the cylinder, a lubricant under pressure for forcing the lip gasket means into sealing relation with the cylinder and with the rod and a coiled spring acting directly upon the lip gasket means for maintaining the lubricant under compression, thus to minimize the formation of gas bubbles therein and the leakage of gas caused thereby.

OSCAR W. LOUDENSLAGER.